(12) United States Patent
Davey et al.

(10) Patent No.: US 7,090,281 B2
(45) Date of Patent: Aug. 15, 2006

(54) SLIDING SUN VISOR

(75) Inventors: Geoffrey William Davey, Huntington Woods, MI (US); Terry Lynn Brandl, Marine City, MI (US); Steven Bradley Herbst, Macomb, MI (US); Jon Theodore Riley, Clarkston, MI (US); Alan Dean Picken, Milford, MI (US)

(73) Assignees: Intier Automotive Inc., Aurora (CA); Link Technologies Inc., Romeo, MI (US)

( * ) Notice: Subject to any disclaimer, the term of this patent is extended or adjusted under 35 U.S.C. 154(b) by 0 days.

(21) Appl. No.: 10/484,862

(22) PCT Filed: Jul. 25, 2002

(86) PCT No.: PCT/US02/23587

§ 371 (c)(1),
(2), (4) Date: May 31, 2005

(87) PCT Pub. No.: WO03/010020

PCT Pub. Date: Feb. 6, 2003

(65) Prior Publication Data

US 2005/0225114 A1    Oct. 13, 2005

(51) Int. Cl.
 *B60J 3/02* (2006.01)
(52) U.S. Cl. .............. 296/97.11; 296/97.4; 296/97.9
(58) Field of Classification Search ........... 296/971, 296/97.4, 97.9, 97.11–97.13
See application file for complete search history.

(56) References Cited

U.S. PATENT DOCUMENTS

| | | | |
|---|---|---|---|
| 2,458,677 A | 1/1949 | Brundage | |
| 2,625,426 A | 1/1953 | Weymouth | |
| 4,582,356 A | 4/1986 | Kaiser et al. | |
| 4,925,233 A * | 5/1990 | Clark | 296/97.11 |
| 4,998,765 A | 3/1991 | Van Order et al. | |
| 5,161,850 A | 11/1992 | Redder | |
| 5,409,285 A | 4/1995 | Snyder et al. | |

(Continued)

FOREIGN PATENT DOCUMENTS

EP    0 899 137 A    3/1999

(Continued)

OTHER PUBLICATIONS

Abstracts of Japan vol. 014, No. 440, Sep. 20, 1990 & JP 02 175340 A.

(Continued)

*Primary Examiner*—D. Glenn Dayoan
*Assistant Examiner*—Greg Blankenship
(74) *Attorney, Agent, or Firm*—Honigman Miller Schwartz and Cohn LLP

(57) ABSTRACT

A sun visor assembly for an automotive vehicle includes a sun visor panel having generally planar opposing sides sandwiched together to define a pocket therebetween. A longitudinally extending support rod is positioned between the opposing sides of the panel for supporting the panel in the interior of the vehicle. An adjustment mechanism is coupled between the support rod and the sun visor panel for providing selective sliding movement of the sun visor panel along the support rod between a retracted position and an extended position. The adjustment mechanism includes a support frame secured to the visor panel having an upper rail forming a longitudinal rack, a guide carriage secured to the support rod and slidably coupled to the support frame, and a gear rotatably supported by the carriage and meshed with the rack for guiding the sun visor panel along the support rod between the retracted and extended positions.

12 Claims, 4 Drawing Sheets

U.S. PATENT DOCUMENTS

| | | |
|---|---|---|
| 5,645,308 A | 7/1997 | Fink |
| 5,653,490 A | 8/1997 | Fink et al. |
| 5,741,040 A * | 4/1998 | Gebauer et al. ........... 296/97.2 |
| 5,871,252 A | 2/1999 | Gute |
| 5,934,734 A | 8/1999 | Wilson |
| 6,099,066 A * | 8/2000 | Corn ....................... 296/97.11 |
| 6,174,019 B1 | 1/2001 | Collet et al. |
| 6,474,717 B1 * | 11/2002 | Viertel et al. ............ 296/97.11 |
| 6,659,528 B1 * | 12/2003 | Wilson ................... 296/97.11 |
| 6,698,814 B1 * | 3/2004 | Mills et al. .............. 296/97.11 |

FOREIGN PATENT DOCUMENTS

WO  WO 94 08811 A  4/1994

OTHER PUBLICATIONS

Abstractf of Japan vol. 006, No. 249, Dec. 4, 1982, & JP 57 144122 A.

* cited by examiner

SLIDING SUN VISOR

BACKGROUND OF THE INVENTION

1. Field of the Invention

This invention relates to sun visor for an automotive vehicle which is selectively slidable between a retracted position and an extended position.

2. Background of the Invention

Automotive vehicles typically include sun visor assemblies mounted to the headliner of the interior compartment of the vehicle. Common sun visor assemblies comprise a visor panel supported by an elongated support rod and pivotally connected to the headliner by a bezzle. The bezzle allows the sun visor assembly to pivot generally 90 degrees to provide sun blockage from either the front or side window of the vehicle. The sun visor panel is also commonly rotatably coupled to the support rod to fold the panel against the headliner when not in use and unfold the panel adjacent the window in use to block sun and glare into the vehicle.

However, the longitudinal length of the sun visor panel is often insufficient to cover the longitudinal width of the window to provide adequate sun blockage.

SUMMARY OF THE INVENTION

Therefore, it is desirable to provide an extendable sun visor wherein the sun visor panel is slidable along the support rod between a normal retracted position and an extended position for covering a larger portion of the window.

According to one aspect of the invention, there is provided a sun visor assembly adapted to be mounted to the interior of an automotive vehicle comprising a sun visor panel having generally planar opposing sides sandwiched together to define a pocket therebetween. A longitudinally extending support rod is positioned between the opposing sides of the panel for supporting the panel in the interior of the vehicle. An adjustment mechanism is coupled between the support rod and the sun visor panel for providing selective sliding movement of the sun visor panel along the support rod between a retracted position and an extended position. The adjustment mechanism includes a longitudinal rack supported by either the sun visor panel or support rod and a gear rotatably supported by the other of the sun visor panel or support rod and meshed with the rack for guiding the sun visor panel along the support rod between the retracted and extended positions.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
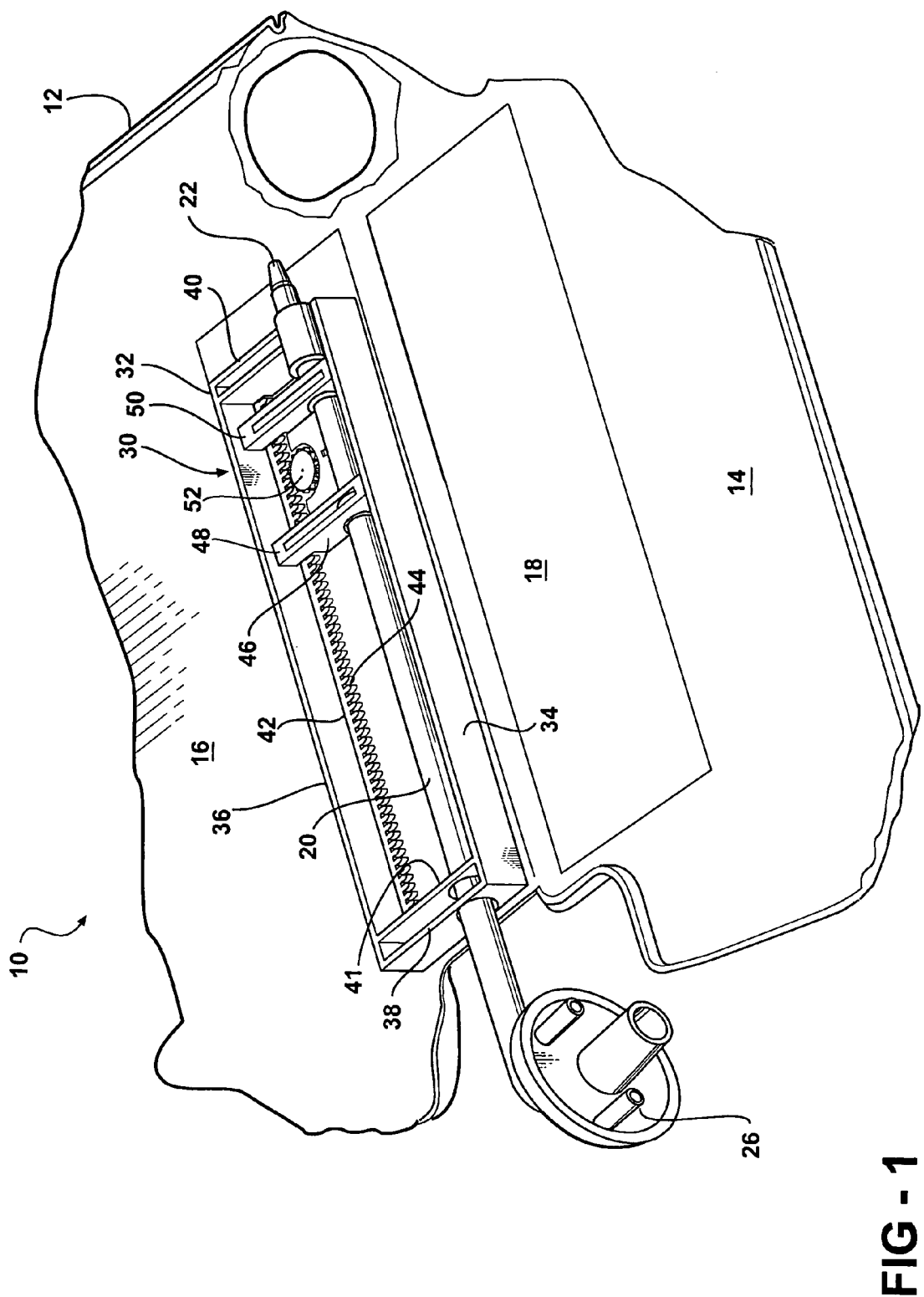
FIG. 1 is a perspective view of the sun visor assembly in the retracted position showing an adjustment mechanism positioned between opposing sides of the sun visor panel.
Figure 2:
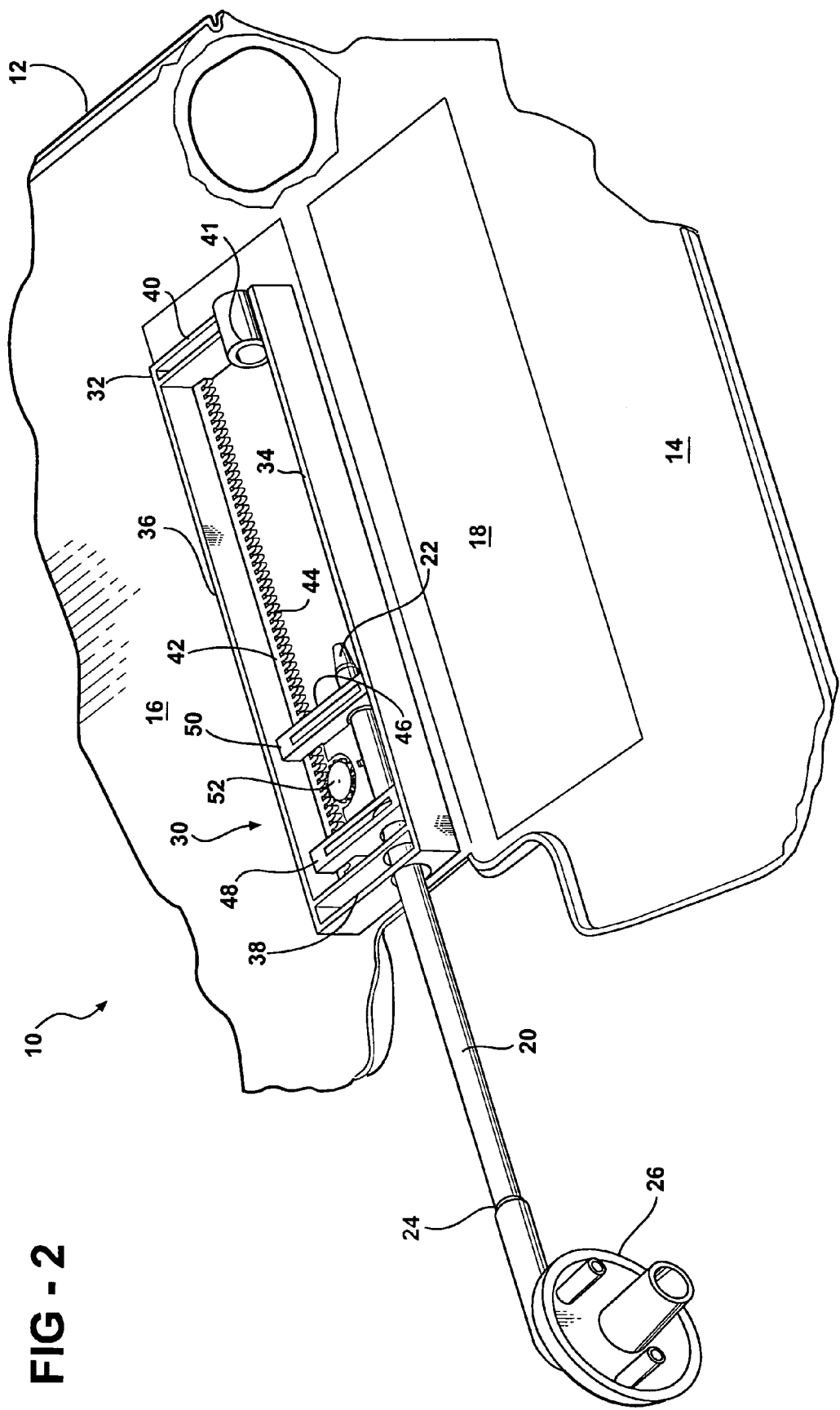
FIG. 2 is a perspective view of the sun visor assembly in the extending position.

Referring to FIGS. 1 and 2, a sun visor assembly for an automotive vehicle is generally shown at 10. The sun visor assembly 10 includes a sun visor panel, or blade, 12 comprising opposing sides or halves 14, 16 which are sandwiched together to form a pocket, or cavity, therebetween. Each side 14, 16 of the panel 12 typically comprises a molded urethane substrate wrapped in a trim cover of cloth, vinyl, leather or other material.

The sun visor assembly 10 further includes a generally tubular support rod 20 extending longitudinally between a first end 22 and second end 24. The support rod 20 is positioned between the opposing sides 14, 16 of the visor panel 12 for supporting the sun visor assembly 10. A bezzle 26 is pivotally coupled to the second end 24 of the support rod 20 for attaching the sun visor assembly 10 to a headliner in the interior compartment of the vehicle. The bezzle 26 allows the sun visor assembly 10 to pivot for use between the front windshield and the side windows of the vehicle as is commonly known to one skilled in the art.

Figure 3:
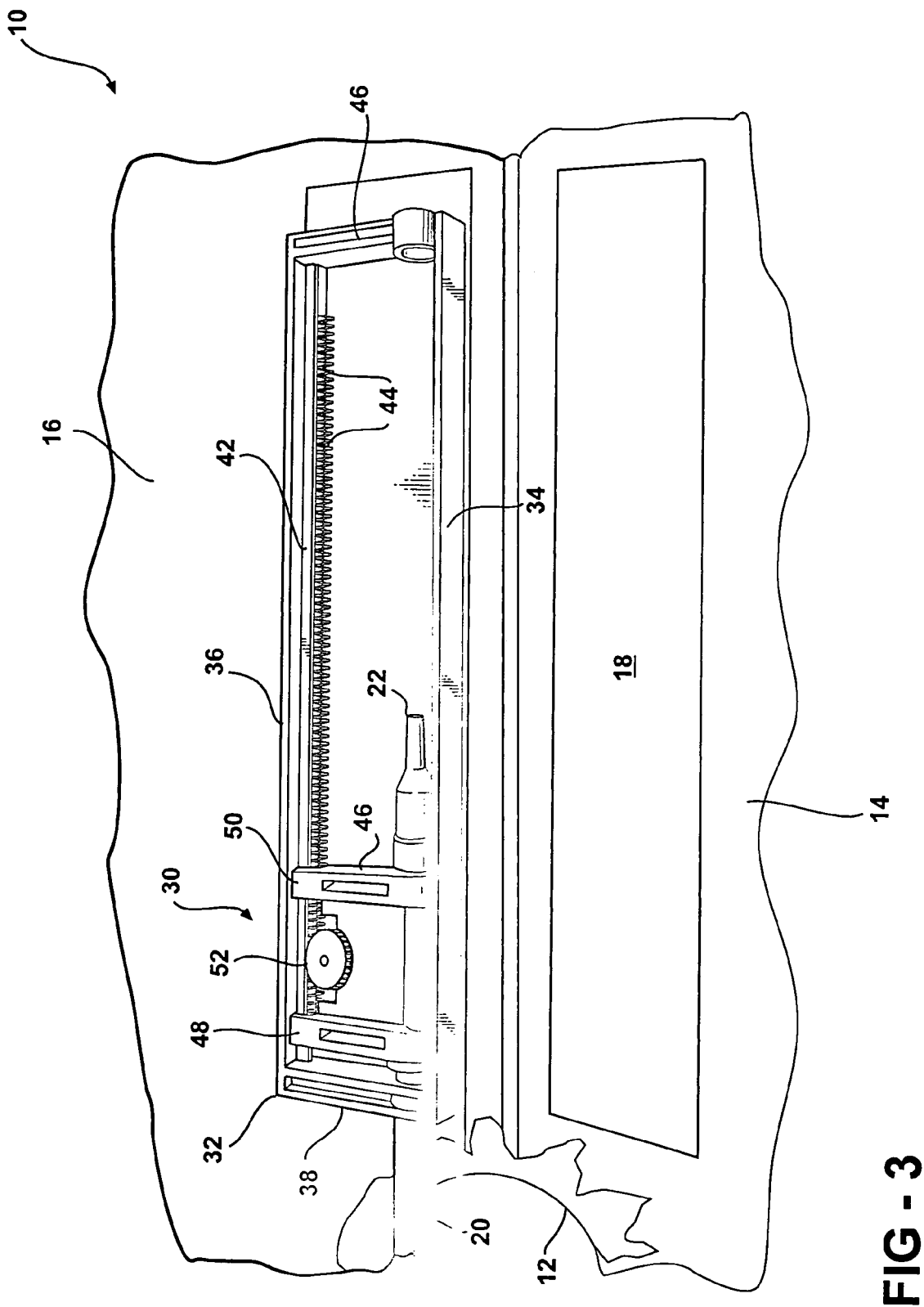
FIG. 3 is an enlarged view of the adjustment mechanism for sliding the sun visor assembly between the retracted and extended positions.
Figure 4:
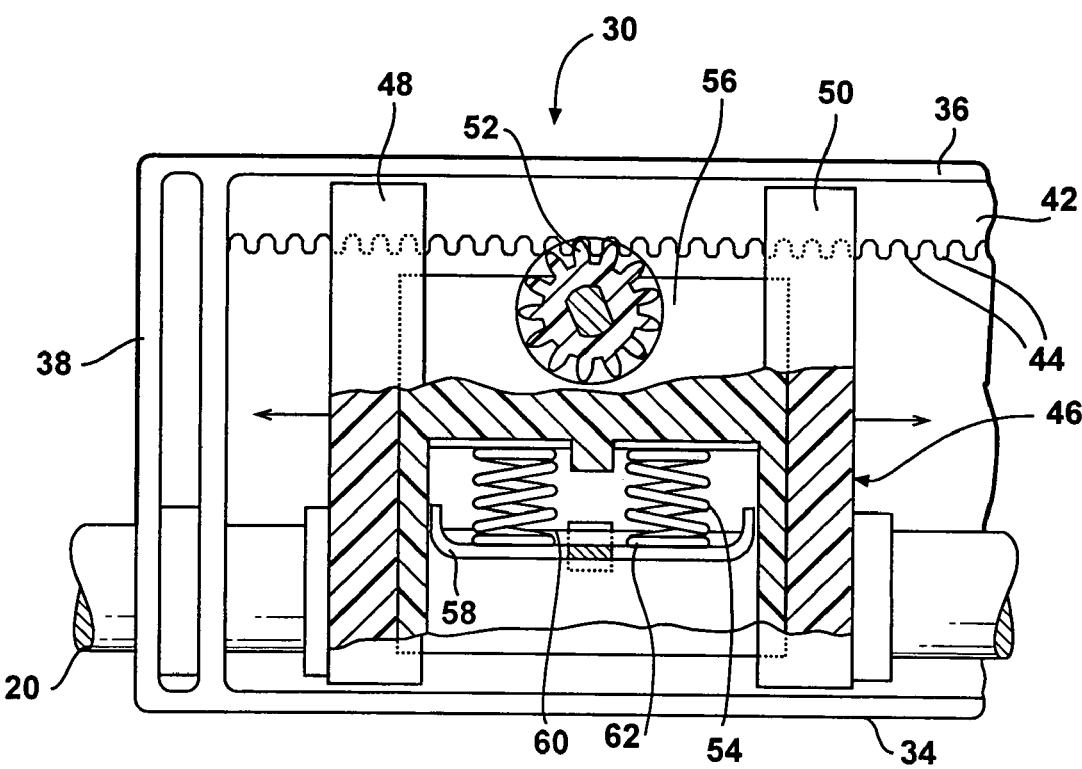
FIG. 4 is a plan view of the adjustment mechanism.

Referring to FIGS. 3 and 4, an adjustment mechanism 30 is coupled between the support rod 20 and the sun visor panel 12 for providing selective sliding movement of the sun visor panel 12 along the support rod 20 between a retracted position, as shown in FIG. 1, and an extended position, as shown in FIG. 2. The adjustment mechanism 30 includes a generally rectangular support frame 32 seated in the pocket 18 between the opposing sides 14, 16 of the sun visor panel 12. The support frame 32 includes spaced apart and generally parallel upper and lower rails 34, 36 interconnected by ends 38, 40. The ends 38, 40 each include an aperture 41 therethrough for slidably receiving the support rod 20 along the longitudinal length of the lower rail 34.

The adjustment mechanism 30 also includes a longitudinal rack 42 extending from the lower rail 36 having a plurality of equally spaced apart teeth 44. A guide carriage 46 is fixedly secured to the support rod 20 adjacent the first end 22 and slidably coupled to the upper rail 36 of the support frame 32 for guiding the support frame 32, and thus the sun visor panel 12, along the longitudinal length of the support rod 20. More specifically, the guide carriage 46 includes spaced apart legs 48, 50 which straddle the upper rail 36 such that the upper rail 36 provides a track for guiding the legs 48, 50 and carriage 46 there along.

A pinion gear 52 is rotatably supported by the guide carriage 46 and meshed with the teeth 44 on the rack 42 for moving the sun visor panel 12 along the support rod 20 between the retracted and extended positions. The pinion gear 52 is biassed against the rack 42 by a damper 54 coupled between the gear 52 and carriage 46 for dampening vibration between the rack 42 and gear 52. More specifically, referring to FIG. 4, the carriage 46 includes a center guide plate 56 slidably mounted between the opposing legs 48, 50 in a direction opposite the longitudinal length of the rack 42. The guide plate 56 is generally U-shaped with each side slidably supported within a channel formed in the side of each leg 48, 50. The pinion gear 52 is rotatably connected to the center guide plate 56 adjacent the rack 42. A retainer plate 58 is fixedly secured to the support rod 20 adjacent the center guide plate 56. The damper 52 includes a pair of coil springs 60, 62 compressed between the guide plate 56 and the retainer plate 58 for biassing the guide plate 56 along the opposing legs 48, 50 toward the rack 42. The damper 52, therefore, allows the guide plate 56 to "float" between the rack 42 and the support rod 20 while maintain meshed engagement between the pinion gear 52 and the rack 42.

In operation, to slide the visor panel 12 between the retracted and extended positions, a pulling or pushing force is applied to the panel 12 longitudinally along the length of the support rod 20. The guide carriage 46 allows the panel 12 to slide along the support rod 20 with the gear 52 being forced to rotate along the rack 42.and travel along the upper rail 36 between the opposing ends 38, 40. The damper 52 provides smooth and constant effort, as well as reduces vibration and noise, during the selective sliding adjustment of the sun visor 10 between the extended and retracted positions.

The above-described embodiment of the invention is intended to be an example of the present invention and alterations and modifications may be effected thereto, by those of skill in the art, without departing from the scope of the invention.

What is claimed is:

1. A sun visor assembly adapted to be mounted to the interior of an automotive vehicle comprising:
    a sun visor panel having generally planar opposing sides sandwiched together to define a pocket therebetween;
    a longitudinally extending support rod positioned between said opposing sides of said panel for supporting said panel in the interior of the vehicle; and
    an adjustment mechanism coupled between said support rod and said sun visor panel for providing selective sliding movement of said sun visor panel along said support rod between a retracted position and an extended position, said adjustment mechanism including a longitudinal rack supported by one of said sun visor panel and said support rod and a gear rotatably supported by the other of said sun visor panel and said support rod and meshed with said rack for guiding said sun visor panel along said support rod between retracted and extended positions.

2. A sun visor assembly as set forth in claim 1 wherein said adjustment mechanism includes a support frame including spaced apart upper and lower rails connected by opposing ends, said support frame fixedly secured in said pocket between said opposing sides of said panel.

3. A sun visor assembly as set forth in claim 2 wherein said longitudinal rack includes a plurality of teeth formed in one of said upper and lower rails for engaging with said gear.

4. A sun visor assembly as set forth in claim 3 wherein said adjustment mechanism includes a guide carriage fixedly secured to said support rod and slidably coupled to said support frame for guiding said support frame along the longitudinal length of said support rod between said retracted and extended positions.

5. A sun visor assembly as set forth in claim 4 wherein said guide carriage includes a pair of spaced apart and generally parallel legs having a first end fixed to said support rod and a second end slidably coupled to one of said upper and lower rails of said support frame.

6. A sun visor assembly as set forth in claim 5 wherein said guide carriage includes a center guide plate slidably coupled between said legs and rotatably supporting said gear for engagement with said teeth of said rack.

7. A sun visor assembly as set forth in claim 6 wherein said adjustment mechanism includes a damper coupled between said gear and said guide carriage for biassing said gear against said rack.

8. A sun visor assembly as set forth in claim 7 wherein said support rod includes opposing first and second ends with said guide carriage mounted therebetween.

9. A sun visor assembly as set forth in claim 8 wherein said legs of said support rack each include an aperture therethrough for receiving said first end of said support rod to slidably mount said support frame to said support rod.

10. A sun visor assembly as set forth in claim 7 wherein said rack is formed in said lower rail and said guide carriage extended between said upper and lower rails for movement between said ends of said support frame defining said extended and retracted positions.

11. A sun visor assembly as set forth in claim 10 wherein said damper includes at least one coil spring compressed between said support rod and said center guide plate for sliding said guide plate toward said lower rail and biassing said gear into meshed engagement with said teeth of said rack.

12. A sun visor assembly as set forth in claim 11 further including a bezzle fixedly secured to said second end of said support rod adapted to fixedly secure said sun visor assembly to a headliner of the vehicle.

* * * * *